United States Patent
Singhal

(10) Patent No.: US 8,319,380 B2
(45) Date of Patent: Nov. 27, 2012

(54) METHOD OF TUNING BENDING AND TORSION STIFFNESS OF DUCTED ROTOR CORE OF AN INDUCTION MOTOR

(75) Inventor: Sumit Singhal, Cincinnati, OH (US)

(73) Assignee: Siemens Industry, Inc., Alpharetta, GA (US)

(*) Notice: Subject to any disclaimer, the term of this patent is extended or adjusted under 35 U.S.C. 154(b) by 554 days.

(21) Appl. No.: 12/567,441

(22) Filed: Sep. 25, 2009

(65) Prior Publication Data

US 2011/0074242 A1  Mar. 31, 2011

(51) Int. Cl.
H02K 15/16 (2006.01)
H02K 1/22 (2006.01)
H02K 5/24 (2006.01)

(52) U.S. Cl. ......... 310/51; 310/216.058; 310/216.057; 310/261.1; 73/458; 73/455; 73/457

(58) Field of Classification Search ......... 310/51, 310/166, 216.117, 216.118, 216.129; 73/455–487, 73/66; H02K 1/22, 5/24
See application file for complete search history.

(56) References Cited

U.S. PATENT DOCUMENTS

| | | | |
|---|---|---|---|
| 3,826,940 A * | 7/1974 | McKean et al. | 310/211 |
| 3,990,141 A | 11/1976 | Stark | |
| 4,083,735 A * | 4/1978 | Caramanian | 156/64 |
| 4,489,249 A * | 12/1984 | Olivier | 310/216.011 |
| 4,970,424 A | 11/1990 | Nakamura et al. | |
| 5,512,792 A * | 4/1996 | Bawin et al. | 310/262 |
| 6,097,115 A | 8/2000 | Tevaarwerk et al. | |
| 6,204,589 B1 * | 3/2001 | Cascio | 310/261.1 |
| 6,441,532 B1 | 8/2002 | Ahrens et al. | |
| 6,614,142 B1 * | 9/2003 | Bonnieman et al. | 310/216.004 |
| 6,741,010 B2 * | 5/2004 | Wilkin | 310/268 |
| 6,949,858 B2 | 9/2005 | White et al. | |
| 7,025,294 B2 * | 4/2006 | Hauch | 241/194 |
| 7,098,569 B2 | 8/2006 | Ong et al. | |
| 2002/0047481 A1 * | 4/2002 | Cascio | 310/261 |
| 2002/0180304 A1 | 12/2002 | Knauff | |
| 2003/0011257 A1 * | 1/2003 | Akemakou | 310/91 |
| 2007/0130752 A1 * | 6/2007 | Hashimoto et al. | 29/596 |

* cited by examiner

Primary Examiner — Quyen Leung
Assistant Examiner — Terrance Kenerly

(57) ABSTRACT

Electrodymamic machine rotating mass, including for example induction motor rotors, stiffness tuning methods include selective orientation and compression of modular tie rod assemblies into through bores formed in the rotor lamination core outboard of the rotor shaft during motor manufacture, repair or refurbishment. Stiffness tuning enables a motor manufacturer to tune a rotor's rotordynamic stability, and hence the assembled motor's critical vibration speed. Electrodynamic machine rotating mass tuning can be adjusted in response to machine physical design, operational application and manufacturing variation attributes that impact the assembled machine's critical vibration frequency. Thus the present invention offers a systematic, holistic approach to motor vibration refinement through use of a simple kit of modular tie rod assemblies oriented and tightened in a selected array. Rotor stiffness tuning can be tested virtually on computer work stations. Additional actual rotor stiffness tuning can be performed during manufacture.

25 Claims, 5 Drawing Sheets

METHOD OF TUNING BENDING AND TORSION STIFFNESS OF DUCTED ROTOR CORE OF AN INDUCTION MOTOR

BACKGROUND OF THE DISCLOSURE

1. Field of the Invention

The invention relates to methods for tuning rotating mass structural stiffness and vibration excitation frequencies in dynamoelectric machines, and more particularly to methods for tuning rotor stiffness and critical speed vibration in induction motors. The invention enables a motor manufacturer to vary selectively rotor stiffness and the motor's critical vibration speed, preferably so that the critical speed is above the highest planned motor operational speed in a single or variable speed motor application.

2. Description of the Prior Art

Machines with rotating masses, including electrodynamic machines, inherently have critical vibration excitation speeds attributable to the structural mechanics of the device and associated system operational forces. In electromechanical systems it is advisable to avoid operating machinery at its first or subsequent harmonic vibration frequency so as to avoid premature wear and possibly damage to the machine. Customers for some intended motor applications establish purchase specifications that demand very low operational vibration throughout the range of all intended operating speeds. One way to avoid operating machinery at a critical vibration speed is to identify that speed and henceforth set the maximum permissible operating speed limit below the critical speed. It follows that a motor manufacturer should seek ways to increase the critical vibration speed of its products to be above prospective customer operational speed requirements, in order to meet customer vibration specifications.

Induction motor vibration influences that ultimately contribute to motor critical vibration speed include among other things: rotor length to diameter ratio, rotor core cross-sectional structure, shrink fit pressure between the rotor core and shaft, stacking spacing between adjoining rotor core laminas, changes in alternating current excitation frequency established by variable speed motor drive controllers, and oil whip rotordynamic stability induced by the hydrodynamic bearings that support the rotor shaft. With respect to excitation frequency vibration influences, induction motors generally are optimized for 50 Hz or 60 Hz alternating current excitation frequencies, including any operational vibration responses. However, AC induction motors that are coupled to variable speed motor control drives often vary the AC excitation frequencies in a range from 30 Hz to 75 Hz. This increased range of AC variable excitation frequencies increase proportionally the motor's responsive critical vibration frequency range. Oil whip is one form of responsive vibration resulting from shaft bearing natural excitation frequency being influenced by motor operational speed. Generally oil lubricated hydrodynamic bearings in induction motors are susceptible to oil whip when the rotor speed is over roughly twice bearing system's inherent critical speed. Oil whip vibration instability causes the rotor shaft to flex in a sinusoidal curve between the bearings.

Cumulatively the sum of all induction motor vibration influences and the motor's physical structure, including manufacturing variances, establish the motor critical vibration speed. Motor manufacturers want to design motors with critical vibration speeds above their customers' maximum operational speed, in order to satisfy customer demands for "low vibration" motors.

One known suggested potential solution for rotor vibration instability is to stiffen the assembled rotor rotating structure by stiffening the rotor shaft. In the example of oil whip induced vibration instability, stiffening the rotor shaft tends to raise the motor speed that would otherwise cause the onset of oil whip because there is less shaft flexure. Thus, increasing the rotor shaft stiffness raises the motor's critical vibration frequency. There are motor design performance tradeoffs associated with increasing rotor shaft diameter. Induction motor output performance is influenced by the relative proportional volumes of the stator, rotor and shaft within the motor housing. For example, increased shaft diameter increases rotor stiffness but reduces cross-sectional space available to provide for axial cooling passages through the rotor core. Conversely, reducing shaft diameter may enable a designer to improve motor cooling but risks increasing shaft flexure and lowering the motor critical vibration speed. It should also be noted that an optimal motor shaft diameter for one motor frame design in a 60 Hz alternating current system application may not be optimal for a 50 Hz AC application. Focusing too narrowly on one component's optimization (here shaft diameter) is not as preferable as a broader spectrum, holistic "system" solution.

Despite efforts to raise induction motor critical vibration speed through rotor stiffness and other design optimization, potential manufacturing variations alter critical vibration speed for any given completed physical motor. Manufacturing variations typically result from variations in rotor laminas stack compression and spacing from lamination to lamination, shrink fit relative force stresses locally within a specific rotor stack and from rotor to rotor, shaft straightness resulting from both fabrication and assembly handling variations and concentricity of the rotating rotor relative to the stator and motor housing. Variations in manufacturing tolerances and processes lead to different rotordynamic performances, and ultimately differing vibration critical speeds from motor to motor.

Unfortunately, known rotordynamic stability solutions to attempt to raise critical vibration speeds through changes in induction motor design have not provided system-level solutions of how to tune critical vibration characteristics from one motor design to another, from one application of a specific motor design to a different application, or individual manufacturing variances.

Thus, a need exists in the art for a holistic, generalized systematic approach for tuning rotordynamic stability, and hence tuning the critical vibration speed of any individual motor for any given motor design, intended application environment or factory fabrication/refitting variances.

SUMMARY OF THE INVENTION

Accordingly, an object of the present invention is to tune and alter the critical vibration speed of an induction motor by selectively altering the motor's rotordynamic stability notwithstanding the motor's physical design parameters, intended application environment or manufacturing variances.

Another object of the present invention is to alter induction motor rotordynamic stability by selectively tuning the entire rotor structure stiffness, so that the motor critical vibration speed can be altered.

An additional object of the present invention is to tune induction motor rotor stiffness in a virtual environment. In the virtual environment the designer having the ability to alter the rotor physical design, test intended applications of the motor design under different operational parameters that impact rotordynamic stability, and provide for a range of physical characteristics of the rotor stiffness that may result from predictable manufacturing variations in component tolerances and manufacturing processes. In this manner the ultimate critical frequency of the induction motor in the intended application becomes more predictable to the motor designer, applications engineer or customer.

It follows that another object of the present invention is to reduce potential manufacturing variations in induction motor rotors through use of the tuning methods and apparatus described herein, and thereby better predict the critical vibration speed of the induction motor after its manufacture.

Additionally, as another object of the present invention, manufacturing variances or unforeseen vibration influences during design or in application of a motor can be addressed by additional subsequent rotor stiffness tuning in the factory motor assembly process or as part of a motor repair/retrofitting program.

Lastly, it is an object of the present invention to create motors having the structure and tuned by the methods taught herein.

These and other objects are achieved in accordance with the present invention by the rotor stiffness tuning methods and rotors formed by the process of tuning rotor stiffness of the present invention.

One aspect of the present invention is a method for tuning the structural stiffness of the rotor of an induction motor, by providing a rotor having: a rotatable shaft, a rotor core of stacked rotor laminas radially projecting from the shaft and defining a generally cylindrical outer circumference that is generally concentrically aligned with the shaft and axial ends, and a plurality of bores defined in the rotor core through both ends thereof that are radially symmetrical with and generally parallel to the shaft. A dynamically balanced array pattern of tie rods is inserted into at least a portion of the rotor core bores. The rotor core is compressed axially by selectively tensioning the tie rods. Thereafter it is determined whether rotor stiffness resulting from the tie rod insertion and tensioning steps achieves motor performance objectives. If it does, the tuning settings can be reproduced in other motor rotors. Thereafter, if it desired to alter the rotor stiffness, such as in response to another motor application that impacts motor critical vibration speed, one can selectively vary the tie rod insertion array pattern or the tensioning, in order to alter the rotor stiffness for the new application.

The present invention is also directed to a method for manufacturing an induction motor rotor and tuning its structural stiffness by stacking plurality of rotor laminas into a rotor core defining a generally cylindrical outer circumference and axial ends. The rotor laminas have holes therein that collectively define: a central bore generally concentrically aligned with the outer circumference, and a plurality of bores defined in the rotor core through both ends thereof that are radially symmetrical with and generally parallel to the central bore. A dynamically balanced array pattern of tie rods is inserted into at least a portion of the rotor core bores. The rotor core is compressed axially by selectively tensioning the tie rods. Then a rotatable shaft is inserted into the central bore. After rotor assembly, it is determined whether rotor stiffness resulting from the tie rod insertion and tensioning steps achieves desired motor performance objectives. If so, the tuning settings may be replicated in other rotors. Thereafter, if it is desired to alter the rotor stiffness, the tie rod insertion array pattern or the tensioning may be changed for a different motor rotor design or application of the motor.

The present invention includes induction motor rotors comprising that are tuned using the methods of the present invention. The rotor of the present invention includes a rotatable shaft; a rotor core formed from stacked rotor laminas radially projecting from the shaft and defining a generally cylindrical outer circumference that is generally concentrically aligned with the shaft and axial ends, and a plurality of bores defined in the rotor core through both ends thereof that are radially symmetrical with and generally parallel to the shaft. The rotor also has at least two tie rods coupled within respective rotor core bores by the process of: inserting a dynamically balanced array pattern of tie rods into at least a portion of the rotor core bores; compressing the rotor core axially by selectively tensioning the tie rods; and thereafter determining whether rotor stiffness resulting from the tie rod insertion and tensioning steps achieves motor performance objectives. If it does, the results can be replicated for other rotors by repeating the insertion and tensioning on other rotors by selecting additional tie rods and rotor blanks from the store kit. Thereafter, if it is desired to alter the rotor stiffness, the tie rod insertion array pattern or the tensioning can be selectively reconfigured.

The present invention may also be embodied in a kit having component parts capable of being assembled to tune structural stiffness of an induction motor rotor. Such a kit includes a rotor assembly having a rotatable shaft; a rotor core formed from stacked rotor laminas radially projecting from the shaft, and defining both a generally cylindrical outer circumference that is generally concentrically aligned with the shaft and axial ends. The rotor core also has a plurality of bores defined in the rotor core through both of its ends that are radially symmetrical with and generally parallel to the shaft. The kit includes a plurality of modular tie rods adapted to be inserted and tensioned selectively into at least a portion of the rotor core bores in a first dynamically balanced array pattern, so as to tune selectively a first rotor stiffness characteristic resulting from first the tie rod insertion and tensioning. The tie rods are further adapted to be removed, reinserted and retensioned in a second or other successive dynamically balanced array pattern in order to tune the rotor for a second stiffness characteristic.

Tuning rotor stiffness by varying the rotor tie rod array and compression forces on the rotor stack allows a motor designer to predict the resultant impact on the motor's critical vibration speed. Tuning can take into account consequences of design applications, such as for example how varying motor excitation frequency with a motor drive controller impacts motor vibration. Tuning concepts of the present invention also reduce variances in individual rotordynamic characteristics by more consistent rotor fabrication. Insertion of a tie rod array into the rotor laminas stack prior to press fitting the shaft facilitates more consistent rotor fabrication. Vibration variances after manufacture can be compensated after assembly by selectively varying the tie rod array and compression. The motor tuning apparatus and methods of the present invention also facilitate cooler motor operation. By incorporating a relatively smaller motor shaft diameter while otherwise achieving desired rotor stiffness additional rotor cross-sectional area can be allocated to enlarge axial cooling passages.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

After considering the following description, those skilled in the art will clearly realize that the teachings of my invention can be readily utilized for tuning rotating mass structural stiffness and vibration excitation frequencies in dynamoelectric machines, and more particularly to methods for tuning rotor stiffness and critical speed vibration in induction motors through the use of axial tie rod arrays.

Tuning rotor stiffness by varying the rotor tie rod array and compression forces on the rotor stack allows a motor designer to predict the resultant impact on the motor's critical vibration speed caused by the motor physical design and the intended application environment.

The present invention use of axial tie rod arrays as part of the rotor fabrication process reduces rotor manufacturing variances, potentially leading to more predictable conformity of the finished motor to its vibration specifications.

Figure 1:
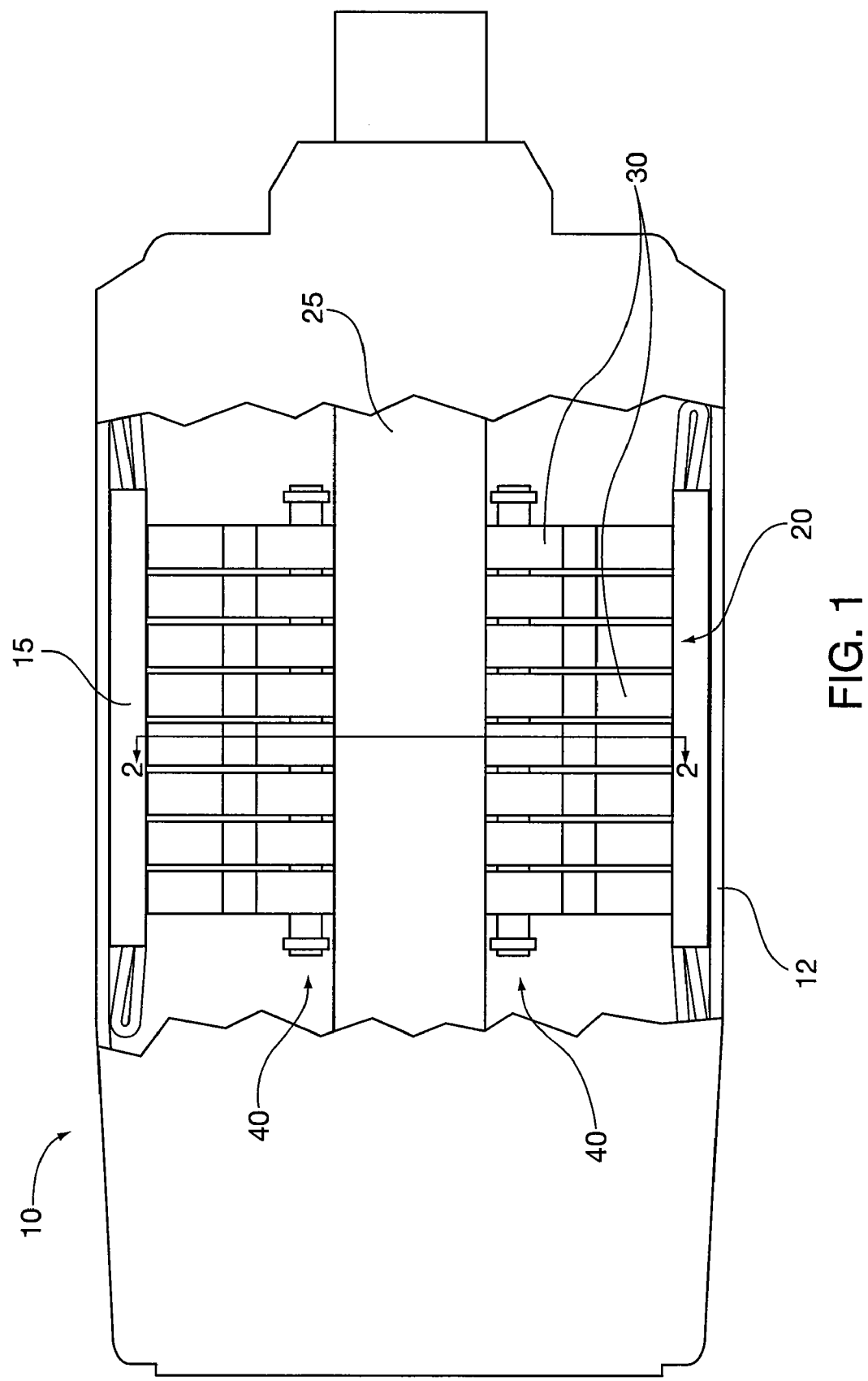
FIG. 1 shows schematically a cut away elevational view of an induction motor incorporating the rotor stiffness and vibration tuning methods and apparatus of the present invention.

FIG. 1 shows an electrodynamic machine induction motor 10 in partial cut away axial view. The exemplary motor 10 is a totally enclosed fan cooled alternating current motor, it being understood that the present invention may be applied to other types of electrodynamic machines and electric motors that have a rotating mass. The motor 10 has a housing 12 and a stator 15 circumferentially oriented therein. The stator 15 forms a generally annular core into which is axially inserted a rotor assembly 20, which shall hereafter generally be referred to as a rotor. The rotor 20 has a shaft 25 onto which are affixed a stack of abutting rotor laminas 30.

Figure 2:
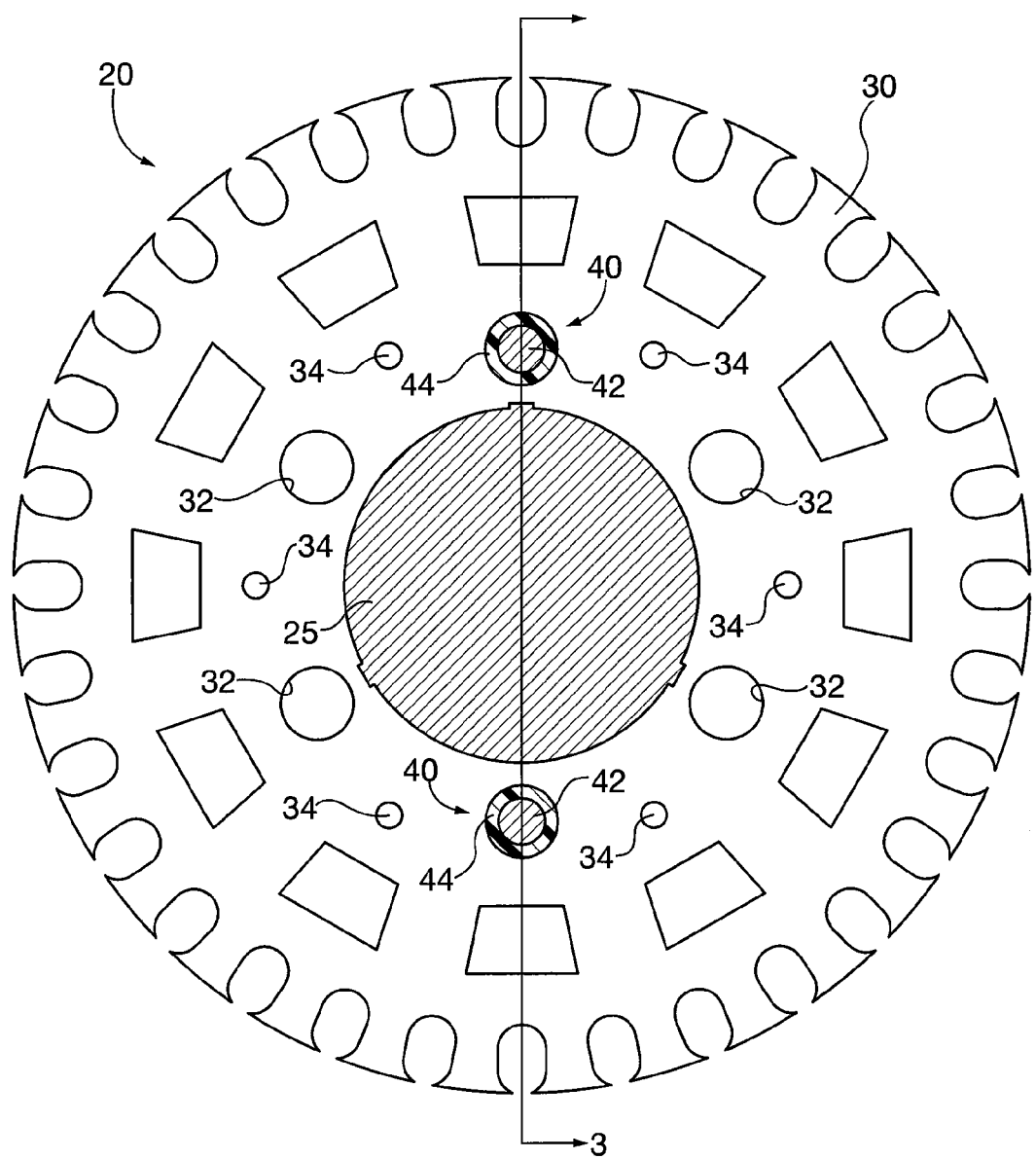
FIG. 2 is a radial cross-section of a rotor incorporating the rotor stiffness and vibration tuning methods and apparatus of the present invention taken along 2-2 of FIG. 1.
Figure 3:
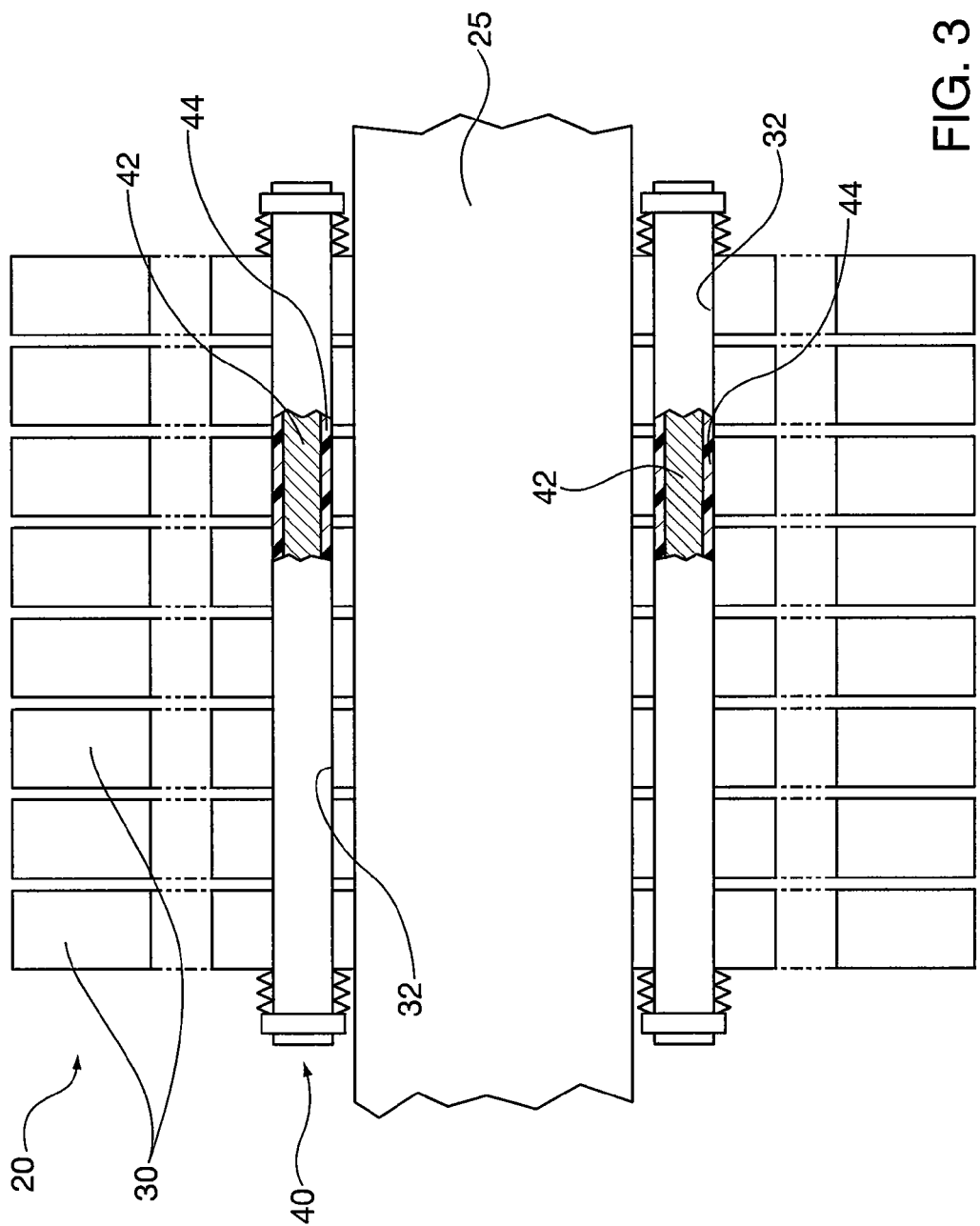
FIG. 3 is an axial cross-section of a rotor showing placement of tie rods used in the rotor stiffness and vibration tuning methods and apparatus of the present invention.
Figure 4:
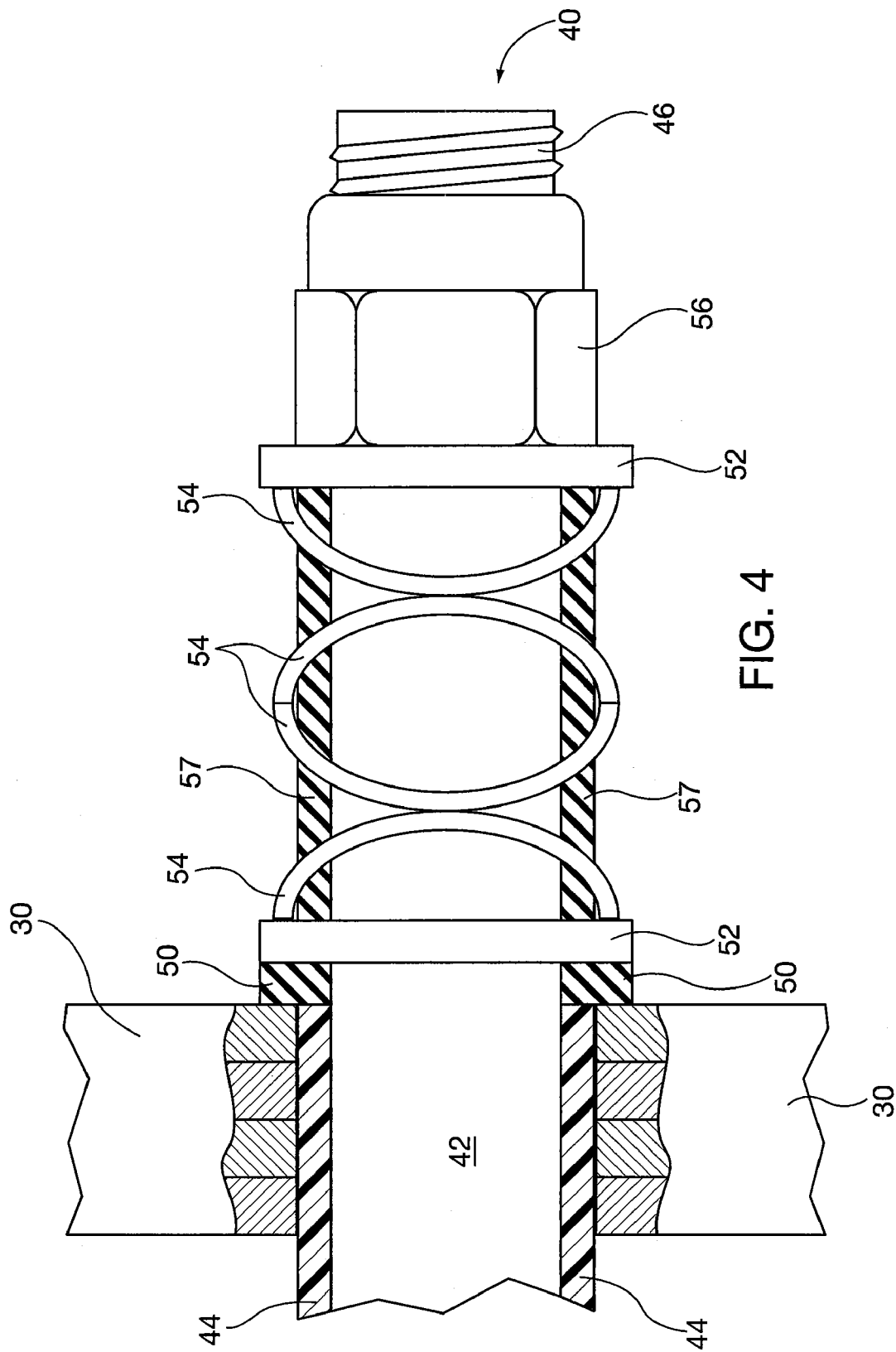
FIG. 4 is a detailed elevational view of the tie rod end of the tie rod shown in FIG. 3.

Referring to FIGS. 1-3, the rotor laminas 30, which are flat sheets of insulation coated ferromagnetic metal (e.g., pressed steel) are abutted to form the rotor core. For simplicity, motor components that are not deemed necessary for one skilled in the art to make and use the present invention are not included in the figures. For example, neither the axial conductive copper or aluminum axial bars that would normally be inserted in the outer periphery slots formed in the rotor laminas nor short circuit rings normally on the respective ends of the rotor 20 are shown.

Tie rod assemblies 40 are selectively inserted in rotationally balanced arrays in aperture bores formed in the rotor stack 30. Each individual lamination blank is stamped with the exemplary inner array 32 and outer array 34 of holes. When collectively stacked the individual laminations are pressed together to form a consolidated rotor core or stack 30. Holes forming the arrays 32, 32 may be oriented in any rotationally balanced pattern and may be of any chosen size that are respectively compatible with the overall rotor design.

Each tie rod assembly 40 has ferromagnetic (e.g., steel) tie rod bar 42 that is surrounded by an electromagnetically insulating (e.g., high temperature plastic polymer tubing) circumferential sleeve 44. While the tie rod bars 42 and sleeves 44 shown have a circular circumferential profile other shapes may be utilized without departing from this invention. The tie rod bars 42 have threaded ends 46 over which are thereafter respectively slidably inserted an insulating washer 50, metal washer 52, a stack of opposing wavy spring washers 54, and another metal washer 52. Another linear biasing element, such as a coil spring or bushing of heat resistant resilient elastomeric material may be substituted for the wavy washers 54. A bushing 57 of elastomeric or other heat resistant resilient material may be interposed circumferentially between the tie rod threaded ends 46 and wavy washers 54 to provide for additional biasing tension or to provide vibration damping for the tie rod assembly 40. After springs and washers are inserted over the threaded tie rod ends 46, they are secured a lock nut 56. Other fasteners may be substituted for the lock nut 56, including permanent brazing, thread-locking coring polymers or castellated nuts with cotter pins or locking wire.

The tie rods 44 are intended to be an integral part of a modular kit of parts at the disposal of a motor manufacturer or servicer. A limited range of tie rod 44 diameters and lengths can be fabricated for a broad range of motor applications. The axial tie rods 40 are oriented in radial arrays outboard of the rotor shaft 25. Their outboard orientation stiffens the entire rotor assembly 20 to resist deflection from both bending and torsional loads. By transferring at least some of the overall rotor 20 deflection resistance to the tie rods 40, the rotor shaft 25 may be constructed with a smaller diameter, saving material costs and allowing allocation of more of the rotor cross-sectional area for cooling vents. Desirably from a manufacturing cost reduction perspective, the shaft 25 diameter and other dimensions and the array pattern of rotor core holes/bores 32, 34 may be standardized for a plurality of motor designs and applications, as some of the rotor core 20 stiffening functional responsibility may be transferred to the modular tie rods 40 oriented selectively, in all or a portion of the rotor core holes/bores 32, 34.

Figure 5:
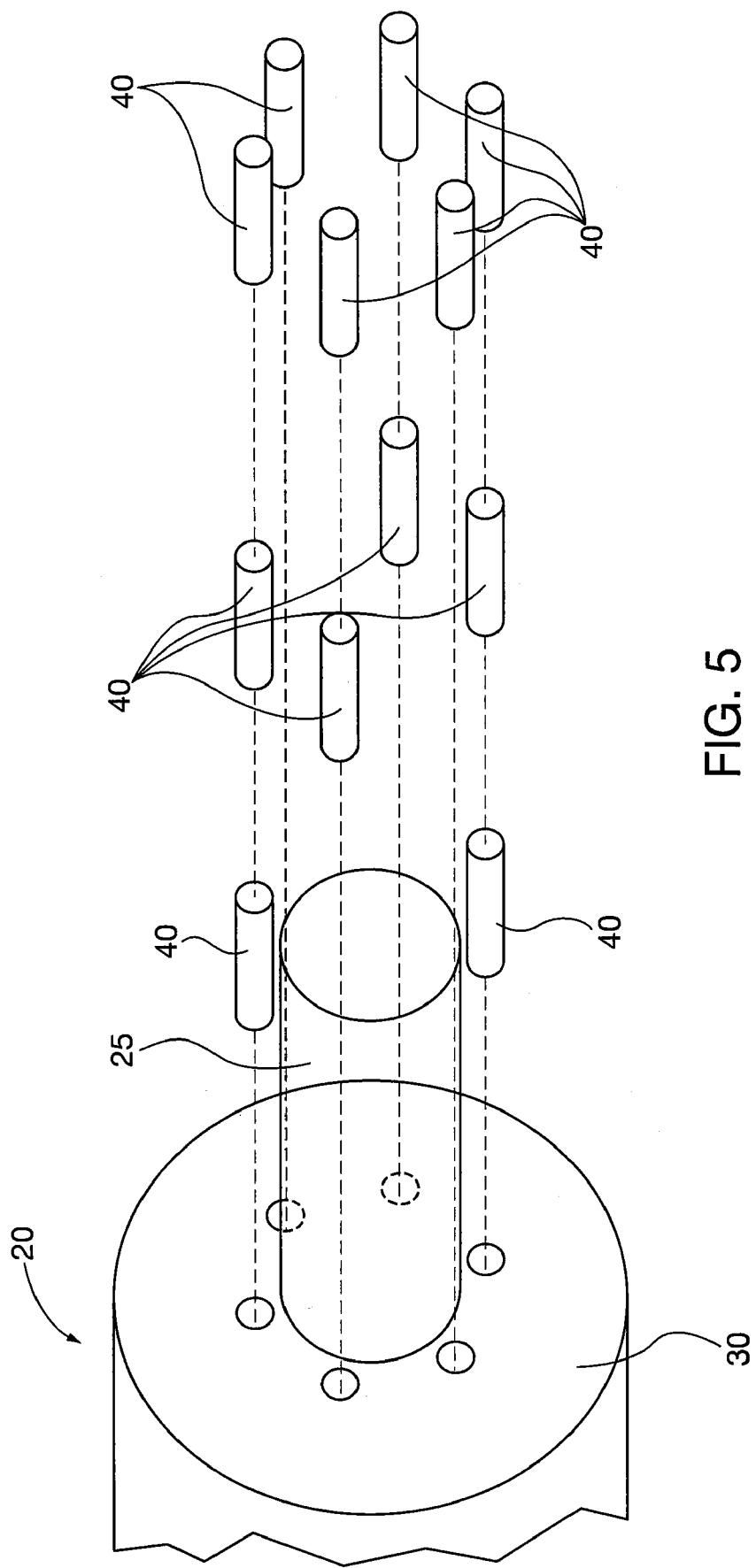
FIG. 5 is a schematic exploded perspective view of a rotor incorporating exemplary arrays of tie rods used in the rotor stiffness and vibration tuning methods and apparatus of the present invention.

Individual motor designs and customer applications can be tested in virtual space with computer aided design and simulation software. Based on virtual testing, a designer has the flexibility to experiment with different tie rod 44 arrays which are radially assembled in vibration stable combinations, so as not to cause rotating imbalance instability. For example in FIGS. 2 and 3 two tie rods 44 are oriented radially 180 degrees apart. As shown in FIG. 5, alternative arrays of 2, 4 or 6 tie rod assemblies 44 may be oriented in the corresponding preformed bores in the rotor laminas stack 30. If preferred, the rotor core 20 may be constructed with a more limited number of tie rod assembly 44 receiving bores specifically chosen for a motor design, but a more generalized rotor lamina stamping having a larger variety of holes for receipt of tie rod assemblies may be more cost effective from a manufacturing perspective. The designer can also perform a simulated virtual tuning of rotor stiffness by varying compression forces of the tie rod on the rotor laminas stack 30 in a computer aided design work station.

Upon insertion of a selected array pattern of tie rods 40, their compression force on the rotor core 30 laminas stack may be selectively varied by advancing or withdrawing the lock nuts 56 on the threaded rod ends 46, as the wavy washers 54 (with or without resilient elastomeric bushings as previously described applying a parallel biasing force) have a generally predictable linear spring force constant under compression. Compression force on the rotor laminas 30 by the tie rod assemblies 44 may be measured by known techniques such as torque wrenches, measurement of tie rod bar 42 elongations, strain gauge instrumentation, localized rotor stack compression measurement or the like. It is also possible to eliminate the wavy washer 54 or equivalent biasing element and directly tighten the lock nuts 56 against the steel washers 52 while still practicing the present invention, though it should be understood that such a practice may complicate rotational dynamics due to rotor thermal expansion and contraction during operation.

Utilization of the rotor-stiffening tie rods 40 of the present invention during rotor fabrication confers the additional benefit of more precise rotor laminas 30 stacking and alignment. The tie rods 40 may be inserted into the corresponding lamina apertures 32, 34 as the lamination stack is being formed to produce the unified rotor core 30. The tie rods 40 may thereafter be pre-torqued prior to press fit insertion of the rotor shaft 25 into the rotor, thereby offering the potential of more precise alignment, less irregular localized stress and consistent compression of the rotor core 30 laminas: in short, more consistent rotor 20 assemblies. As a manufacture standardization process, a batch of rotors may all be assembled with tie rods 40 in a standardized orientation array as a "basic" stiffening solution, and thereafter specific additional rods can be added or subtracted for any particular intended motor application. Recognizing that individual rotors may inevitably exhibit construction variances despite good manufacturing practices, individual assembled rotors 20 can be fine tuned to meet manufacturing specifications by vibration testing and consequent torque adjustment of the tie rod lock nuts 56.

The induction motor rotor stiffness tuning methods and apparatus of the present invention enable a motor manufacturer to tune a rotor's rotordynamic stability, and hence the assembled motor's critical vibration speed, by selective orientation and compression of modular tie rod assemblies during motor manufacture, repair or refurbishment. Electrodynamic machine rotating mass tuning can be adjusted in response to machine physical design, operational application and manufacturing variation attributes that impact the assembled machine's vibration characteristics, including the critical vibration frequency. Thus the present invention offers a systematic, holistic approach to motor vibration refinement through use of a simple kit of modular tie rod assemblies oriented and tightened in a selected array.

Although various embodiments which incorporate the teachings of the present invention have been shown and described in detail herein, those skilled in the art can readily devise many other varied embodiments that still incorporate these teachings.

What is claimed is:

1. A method for tuning the structural stiffness of the rotor of an induction motor for achieving rotordynamic stability objectives, comprising:
providing a rotor having: a rotatable shaft, a rotor core of stacked rotor laminas radially projecting from the shaft and defining a generally cylindrical outer circumference that is generally concentrically aligned with the shaft and axial ends, and a plurality of bores defined in the rotor core through both ends thereof that are radially symmetrical with and generally parallel to the shaft;
inserting a dynamically balanced array pattern of tie rods into at least a portion of the rotor core bores;
compressing the rotor core axially by selectively tensioning the tie rods to create a first rotor stiffness characteristic;
determining whether the first rotor stiffness characteristic resulting from the tie rod insertion and compressing steps achieves motor rotordynamic stability objectives; and
adjusting at least one tie rod in the array pattern of tie rods in order to selectively tune a second rotor stiffness characteristic for achieving the rotordynamic stability objectives, if the first rotor stiffness characteristic does not achieve rotordynamic stability objectives.

2. The method of claim 1, wherein the adjusting step comprises repositioning the tie rods.

3. The method of claim 1, wherein the compressing step further comprises providing a biasing element on at least one end of one tie rod and adjusting the biasing element tension as part of the tensioning steps.

4. The method of claim 3, wherein the biasing element is selected from a group consisting of wavy washers, mechanical springs and resilient elastomers.

5. The method of claim 4, wherein the biasing element includes a tuned damper for damping rotor vibrations.

6. The method of claim 1, wherein the plurality of rotor bores is arrayed in a standard design pattern in a plurality of different rotors, and subsets of the array are designated for tie rod insertion and tensioning for different tuning applications.

7. The method of claim 1, wherein the adjusting step comprises retensioning the tie rods.

8. A method for manufacturing an induction motor rotor and tuning the structural stiffness thereof for achieving rotordynamic stability objectives, comprising:
stacking plurality of rotor laminas into a rotor core defining a generally cylindrical outer circumference and axial ends, the rotor laminas having holes therein that collectively define: a central bore generally concentrically aligned with the outer circumference, and a plurality of bores defined in the rotor core through both ends thereof that are radially symmetrical with and generally parallel to the central bore;
inserting a dynamically balanced array pattern of tie rods into at least a portion of the rotor core bores;
compressing the rotor core axially by selectively tensioning the tie rods to create a first rotor stiffness characteristic;
inserting a rotatable shaft into the central bore;
determining whether the first rotor stiffness characteristic resulting from the tie rod insertion and compressing steps achieves motor rotordynamic stability objectives; and
adjusting the array pattern of tie rods in a second dynamically balanced array pattern in order to selectively tune a second rotor stiffness characteristic for achieving the rotordynamic stability objectives, if the first rotor stiffness characteristic does not achieve rotordynamic stability objectives.

9. The method of claim 8, wherein the adjusting step comprises repositioning the tie rods.

10. The method of claim 8, wherein the compressing step further comprises providing a biasing element on at least one end of one tie rod and adjusting the biasing element tension as part of the tensioning steps.

11. The method of claim 10, wherein the biasing element is selected from a group consisting of wavy washers, mechanical springs and resilient elastomers.

12. The method of claim 8, wherein the plurality of rotor bores is arrayed in a standard design pattern in a plurality of different rotors, and subsets of the array are designated for tie rod insertion for different tuning applications.

13. The method of claim 8, wherein the adjusting step comprises retensioning the tie rods.

14. An induction motor rotor comprising:
a rotatable shaft;

a rotor core formed from stacked rotor laminas radially projecting from the shaft and defining a generally cylindrical outer circumference that is generally concentrically aligned with the shaft and axial ends, and a plurality of bores defined in the rotor core through both ends thereof that are radially symmetrical with and generally parallel to the shaft; and at least two tie rods coupled within respective rotor core bores by the process of:
- inserting a dynamically balanced array pattern of tie rods into at least a portion of the rotor core bores;
- compressing the rotor core axially by selectively tensioning the tie rods;
- determining whether rotor stiffness resulting from the tie rod insertion and tensioning steps achieves motor rotordynamic stability objectives; and
- the tie rods further adapted to be removed, reinserted and re-tensioned in a second dynamically balanced array pattern in order to tune selectively a second rotor stiffness characteristic for achieving the rotordynamic stability objectives.

15. The rotor of claim 14, wherein at least one end of one of the tie rods has a biasing element, the tension of which is adjusted as part of the tensioning steps.

16. The rotor of claim 14, wherein the biasing element is selected from a group consisting of wavy washers, mechanical springs and resilient elastomers.

17. The rotor of claim 16, wherein the biasing element includes a tuned damper for damping rotor vibrations.

18. The rotor of claim 14, wherein the plurality of rotor bores is arrayed in a standard design pattern in a plurality of different rotors, and subsets of the array are designated for tie rod insertion for different tuning applications.

19. The rotor of claim 14, wherein the core bores are oriented in concentric inner and outer rings.

20. A kit having component parts capable of being assembled to tune structural stiffness of an induction motor rotor for achieving rotordynamic stability objectives, comprising:
- a rotatable shaft;
- a rotor core formed from stacked rotor laminas radially projecting from the shaft, and defining both a generally cylindrical outer circumference that is generally concentrically aligned with the shaft and axial ends, and a pluralty of bores defined in the rotor or through both ends thereof that are radially symmetrical with and generally parallel to the shaft; and
- a plurality of tie rods adapted to be inserted and tensioned selectively into the into at least a portion of the rotor core bores in a first dynamically balanced array pattern, so as to tune selectively a first rotor stiffness characteristic resulting from the tie rod insertion and tensioning, the tie rods further adapted to be removed, reinserted and re-tensioned in a second dynamically balanced array pattern in order to tune selectively a second rotor stiffness characteristic for achieving the rotordynamic stability objectives if the first rotor stiffness characteristic does not achieve the rotordynamic stabiliy objectives.

21. The kit of claim 20, wherein at least one end of one of the tie rods has a biasing element, the tension of which is adjusted as part of the tensioning steps.

22. The kit of claim 21, wherein the biasing element is selected from a group consisting of wavy washers, mechanical springs and resilient elastomers.

23. The kit of claim 22, wherein the biasing element includes a tuned damper for damping rotor vibrations.

24. The kit of claim 20, wherein the plurality of rotor bores is arrayed in a standard design pattern in a plurality of different rotors, and subsets of the array are designated for tie rod insertion for different tuning applications.

25. A method for tuning the structural stiffness of a plurality of induction motor rotors for achieving rotordynamic stability objectives, comprising:
- providing a first rotor having: a rotatable shaft, a rotor core of stacked rotor laminas radially projecting from the shaft and defining a generally cylindrical outer circumference that is generally concentrically aligned with the shaft and axial ends, and a plurality of bores defined in the rotor core through both ends thereof that are radially symmetrical with and generally parallel to the shaft;
- inserting into the first rotor a dynamically balanced array pattern of tie rods into at least a portion of the rotor core bores;
- compressing the rotor core of the first rotor axially by selectively tensioning the tie rods to create a first stiffness characteristic;
- determining whether the first rotor first stiffness characteristic resulting from the tie rod insertion and compressing steps achieves motor rotordynamic stability objectives;
- adjusting at least one tie rod in the array pattern of the tie rods in the first rotor in order to selectively tune a second stiffness characteristic for achieving the rotordynamic stability objectives, if the first stiffness characteristic does not achieve rotordynamic stability objectives; and
- assembling a plurality of rotors to match the stiffness characteristic of the first rotor that achieves the rotordynamic stability objectives.

* * * * *